July 4, 1933.  J. G. GRACEY  1,917,030
COMBINED ADVERTISING AND DISPLAY DEVICE
Filed June 9, 1932   3 Sheets-Sheet 1
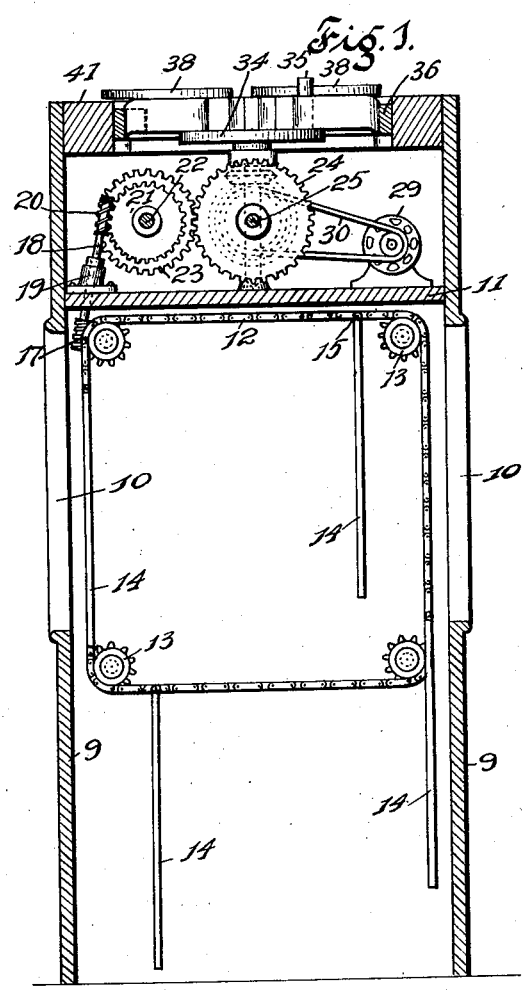
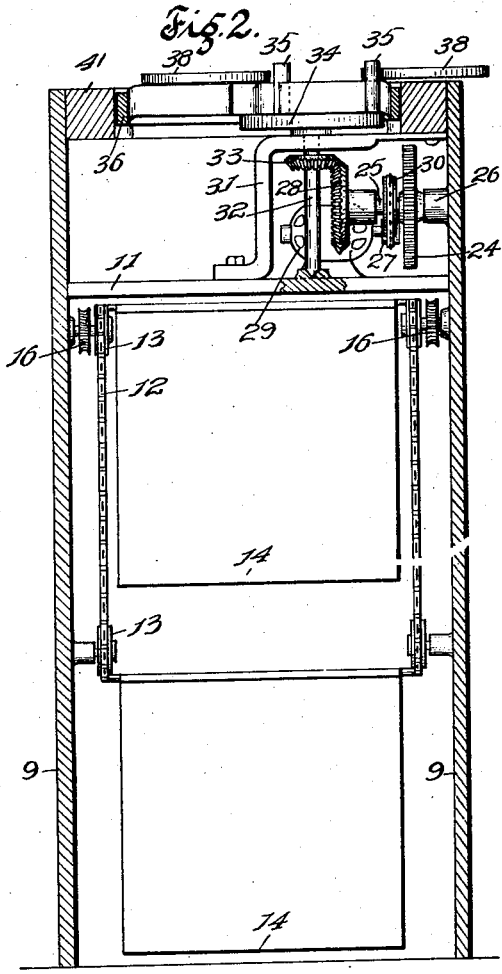
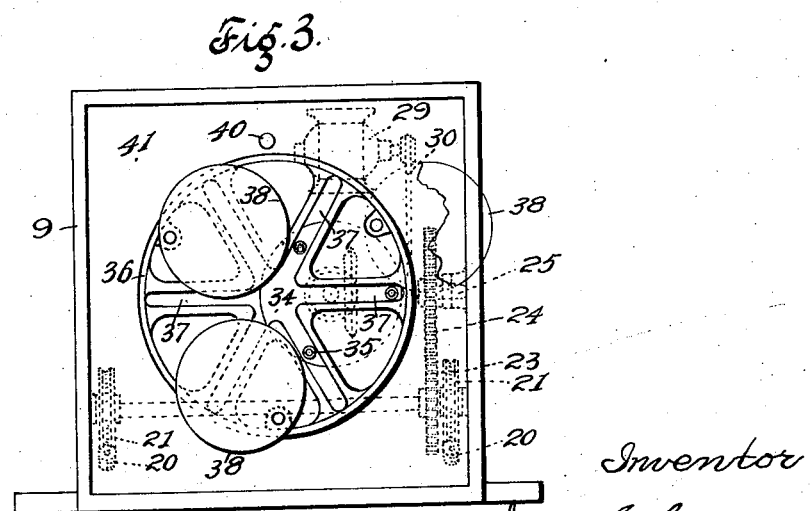
Inventor
James G Gracey July 4, 1933.                J. G. GRACEY                1,917,030
                 COMBINED ADVERTISING AND DISPLAY DEVICE
                   Filed June 9, 1932        3 Sheets-Sheet 2

Inventor.
James G Gracey

July 4, 1933.   J. G. GRACEY   1,917,030
COMBINED ADVERTISING AND DISPLAY DEVICE
Filed June 9, 1932   3 Sheets-Sheet 3
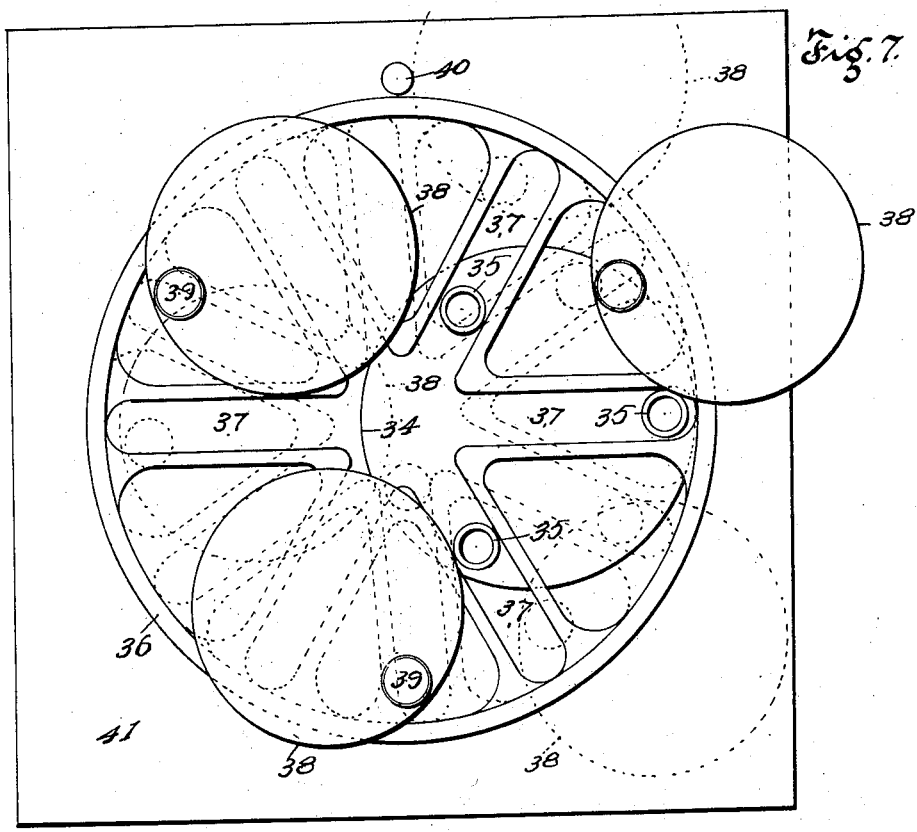
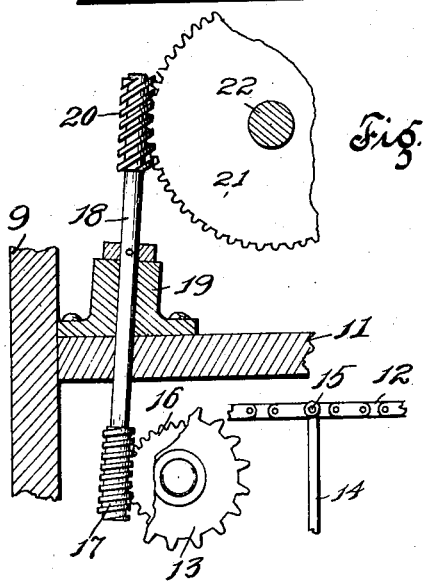
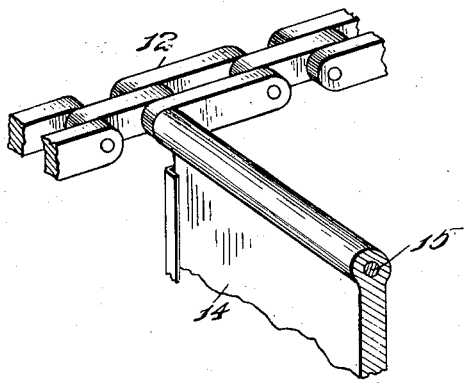
Inventor
James G Gracey Patented July 4, 1933 1,917,030

UNITED STATES PATENT OFFICE

JAMES G. GRACEY, OF ST. LOUIS, MISSOURI

COMBINED ADVERTISING AND DISPLAY DEVICE

Application filed June 9, 1932. Serial No. 616,239.

This invention relates to improvements in a combined advertising and display device the same being of the nature of a mechanism for displaying dressed models or dummies in moving fashion as well as to place in motion various advertisements, this device being applicable for use in show windows as well as being installed at conspicuous locations, the same displaying any kind of object designating the article to be sold, as well as displaying slowly moving advertisements.

When using the device for displaying models or dummies in show windows, the lower part of the apparatus containing the advertisements may be dispensed with, thus bringing the model or dummy operating mechanism conveniently low so as to bring the objects while in motion in proper observation to the observer.

Another object of the invention is to provide a mechanism by which advertisements such as cards, signs or the like are placed in slow motion the same arranged to move upwardly on a vertical plane and then move rearwardly on a horizontal plane and at all times in view.

Another object of the invention is the general arrangement, construction and combination of parts as will be more fully hereinafter described and set forth in the claims.

Figure 1 is a vertical sectional view of my invention with the upper objects removed.

Figure 2 is a vertical cross sectional view of the same.

Figure 3 is a top plan view of the device.

Figure 7 is an enlarged top plan view of the rotating member displaying the models carried thereby.

Figure 8 is an enlarged detail view of the worm mechanism made use of for imparting motion to the advertising mechanism.

Figure 9 is a detail perspective view of a portion of the sprocket chain made use of on which is supported the advertising sign supporting frames to be displayed in the under section of the device.

Figure 4:
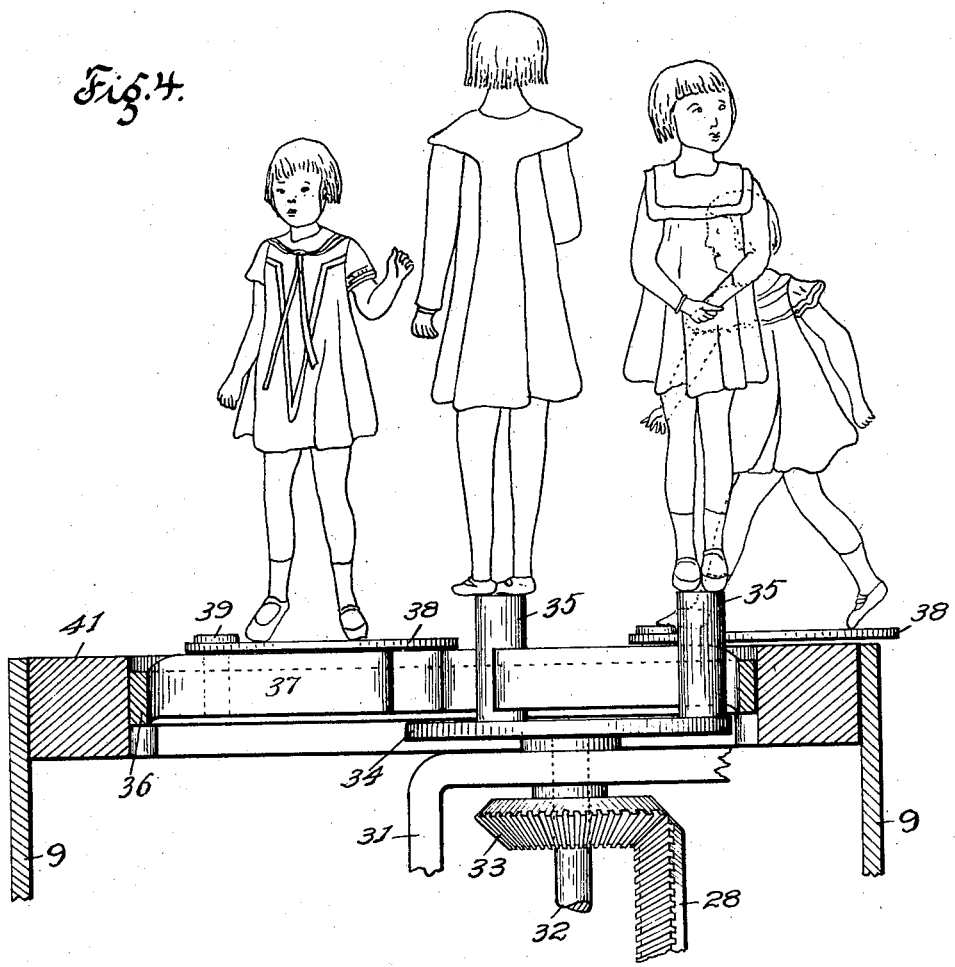
Figure 4 is an enlarged central vertical sectional view of the upper rotating mechanism showing the position of the models on which such articles as wearing apparel are displayed.
Figure 5:
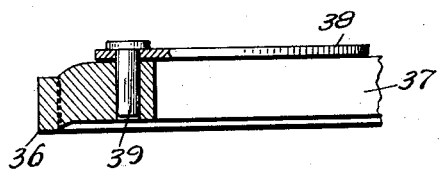
Figure 5 is an enlarged detail sectional view of a portion of the rotating mechanism showing the position of one of the moving discs.
Figure 6:
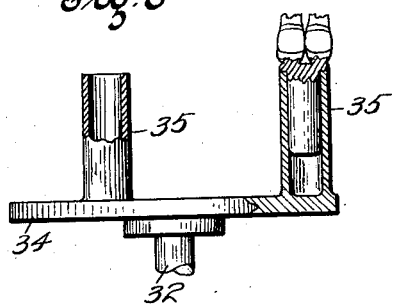
Figure 6 is a detail side view of the turn table made use of for placing the rotating mechanism in operation, and the manner of supporting the models carried thereby.

In the general construction of my invention I provide a suitable frame 9 the same provided with openings 10 through which the advertising devices can be observed, in this frame is provided a horizontal partition 11 on which is mounted the operating mechanism for placing the entire device in operation.

In the under portion of the frame and below the horizontal partition 11 is located an endless conveyor consisting of a pair of endless sprocket chains 12 supported on sprocket wheels 13 conveniently mounted and at suitable intervals on the chains are positioned frames 14 to which are attached advertising signs or the like.

These frames are supported on the chains by means of rods 15 and passing through the upper tubular end of the frames so that when the conveyor is in operation the frames will always swing in a vertical position in the housing.

On two of the sprocket wheels 13 are mounted worm wheels 16 by which the endless conveyor is placed in operation from the upper mechanism. Meshing with the worm wheels 13 are worm pinions 17 supported on shafts 18 mounted in suitable bearings 19, the opposite ends of said shafts being also provided with worm pinions 20 meshing with worm gears 21 supported on a shaft 22, on this shaft is also supported a gear wheel 23 which is in mesh with a gear wheel 24 mounted on a short or stub shaft 25 supported in a bearing 26, and on this shaft is a sprocket wheel 27 and a bevel gear 28, all of these wheels being placed in operation by a motor 29 through the agency of a sprocket chain 30.

In the upper portion of the frame and securely attached to the horizontal partition is a bracket 31 in which is mounted a vertical shaft 32 on which is mounted a bevel pinion 33 and a turn table 34 all placed in rotation through the agency of the motor.

The turn table is equipped with posts 35 preferably of socket formation and to these posts are attached or supported the models or dummies on which the articles to be displayed are carried; these models or dummies are placed in slow motion during the rotation of the turn table at the same time the posts simultaneously rotate a spider shaped frame or table 36.

This member is provided with a plurality of guide ways 37 in which the posts operate and during the operation of the turn table, these posts move the member in slow rotation; on this member is detachably positioned discs 38 held in position thereon by pins 39 so that said discs may also move in a rotary manner when contacting with the posts as well as with a post 40 positioned on the top 41 of the device proper.

To the discs 38 are attached in any desirable manner any nature of object to be displayed, either a model or dummy, or any other kind of device appropriate for the purpose.

By this arrangement of device the objects are place in slow motion bringing each object in various positions, that is to say showing the front, then side, then rear, so that when a certain gown or coat is displayed the observer can see the article from all angles.

The arrangement of the discs 38 on the moving member 36 is such that when the same is being rotated by the turn table, said discs when contacting with the post 40 positioned on the top will turn the same inwardly, and as the moving member travels on, then the discs are again turned outwardly by contact with the posts 35 of the turn table; in this manner it turns the object to various positions during its travel. The objects carried by the posts 35 likewise assume various positions during their travel.

The upper horizontal motion may be also adapted for an amusement device, that is by constructing the same to a large scale, and seats placed on the discs and posts, the rider will be turned in various positions during the rotating motion of the upper moving arrangement.

The device for display purposes is so geared as to move quite slowly so that the objects on display can be readily studied during their motion and the advertising signs on display readily and thoroughly read.

Should the device be placed on the outside, then in order to protect the upper portion of the device, the same may be incased with a suitable covering of transparent material such as a glass housing, by this means the objects as well as the working mechanism will be protected from rain, snow and disagreeable weather.

Some and other changes may be made in the construction and arrangement of my invention above set forth without departing from the real spirit and purpose thereof; and it is my intention to cover by the following claims any modified form of structure or use of equivalents which may be reasonably included within their scope.

Having fully described my invention what I claim is:

1. A device of the character described comprising a frame, a housing forming the upper part thereof, a rotatable Geneva wheel positioned in the housing, a turntable located in the housing and positioned eccentrically to the Geneva wheel, posts located on the turntable the same extending through slots formed in the Geneva wheel and by which the Geneva wheel is rotated, detachable discs eccentrically mounted on the Geneva wheel, a driving means for operating the turntable and dummies located on the discs and turntable posts, substantially as specified.

2. A device of the character described comprising a frame, a housing formed in said frame, a turntable axially mounted in said housing, a Geneva wheel supported by the housing, discs eccentrically mounted on the Geneva wheel, means for changing the position of the discs when in motion, means carried by the turntable for moving the Geneva wheel, detachable merchandise supporting means carried by the discs and turntable Geneva wheel operating means, and an operating mechanism located in the housing by which the device is placed in motion, substantially as specified.

3. A device of the character described comprising a frame, a housing formed therein, a turntable axially mounted in said housing, a Geneva wheel supported in a recess formed in the top of the housing and operated by the turntable, posts carried by the turntable and operating in slots formed in the Geneva wheel, discs eccentrically mounted on the Geneva wheel, means for supporting display devices, means for shifting the discs during their movement with the Geneva wheel, and a driving means located in the housing by which the turntable is operated, substantially as specified.

4. A device of the character described comprising a suitable frame, a housing forming a part thereof, an operating mechanism supported in the housing, a turntable, a Geneva wheel in close proximity with the turntable, means carried by the turntable for imparting motion to the Genera wheel, discs carried by the Geneva wheel and on which are supported articles of merchandise for display, means for shifting the motion of the discs during their travel with the Geneva wheel, in combination with an advertising display mechanism mounted in the frame and operated simultaneously with the display mechanism, substantially as specified.

In testimony whereof I hereunto affix my signature.

JAMES G. GRACEY.